No. 884,328. PATENTED APR. 7, 1908.
N. GOODYEAR.
ACETYLENE GENERATOR.
APPLICATION FILED MAY 4, 1905.

5 SHEETS—SHEET 1.

Attest:

Inventor:
Nelson Goodyear
by Dickerson, Brown, Raegener & Binney
Attys.

No. 884,328. PATENTED APR. 7, 1908.
N. GOODYEAR.
ACETYLENE GENERATOR.
APPLICATION FILED MAY 4, 1905.

5 SHEETS—SHEET 2.

Attest:
E. O. Mitchell
A. L. O'Brien

Inventor:
Nelson Goodyear
by Dickerson, Brown, Raegener & Binney
Attys.

No. 884,328. PATENTED APR. 7, 1908.
N. GOODYEAR.
ACETYLENE GENERATOR.
APPLICATION FILED MAY 4, 1905.
5 SHEETS—SHEET 3.
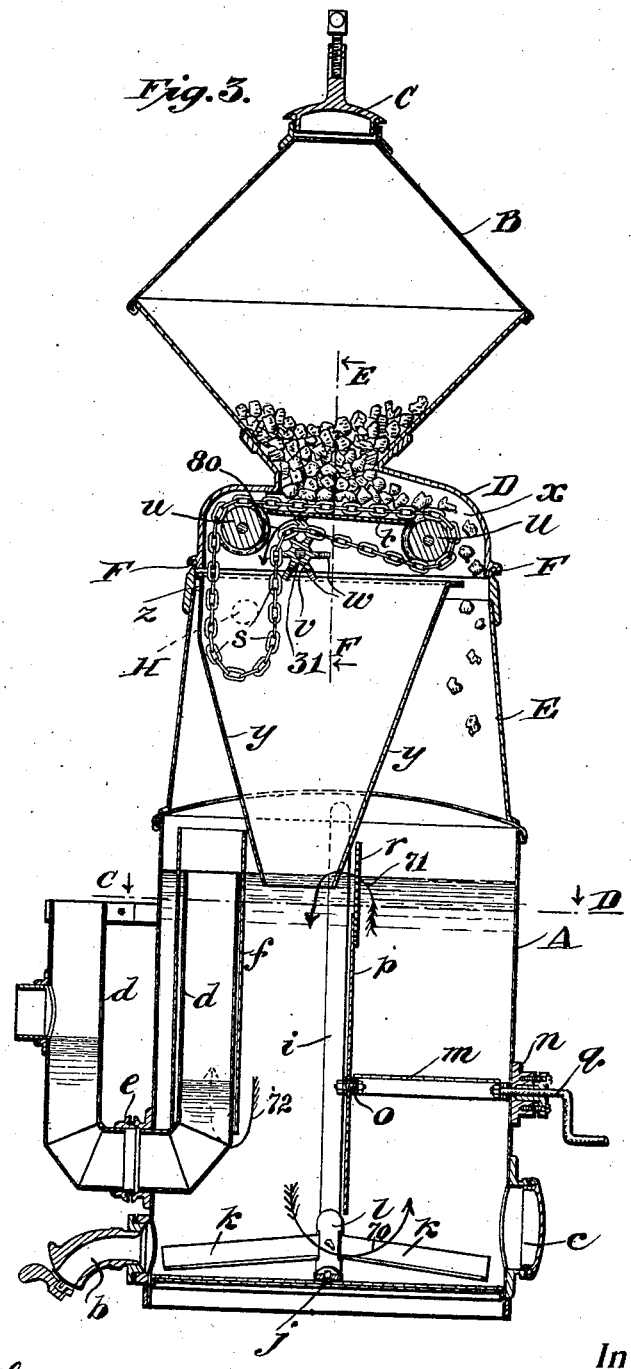
Attest:
E. Mitchell
A. L. O'Brien
Inventor:
Nelson Goodyear
by Dickerson, Brown, Raegener & Binney
Attys.

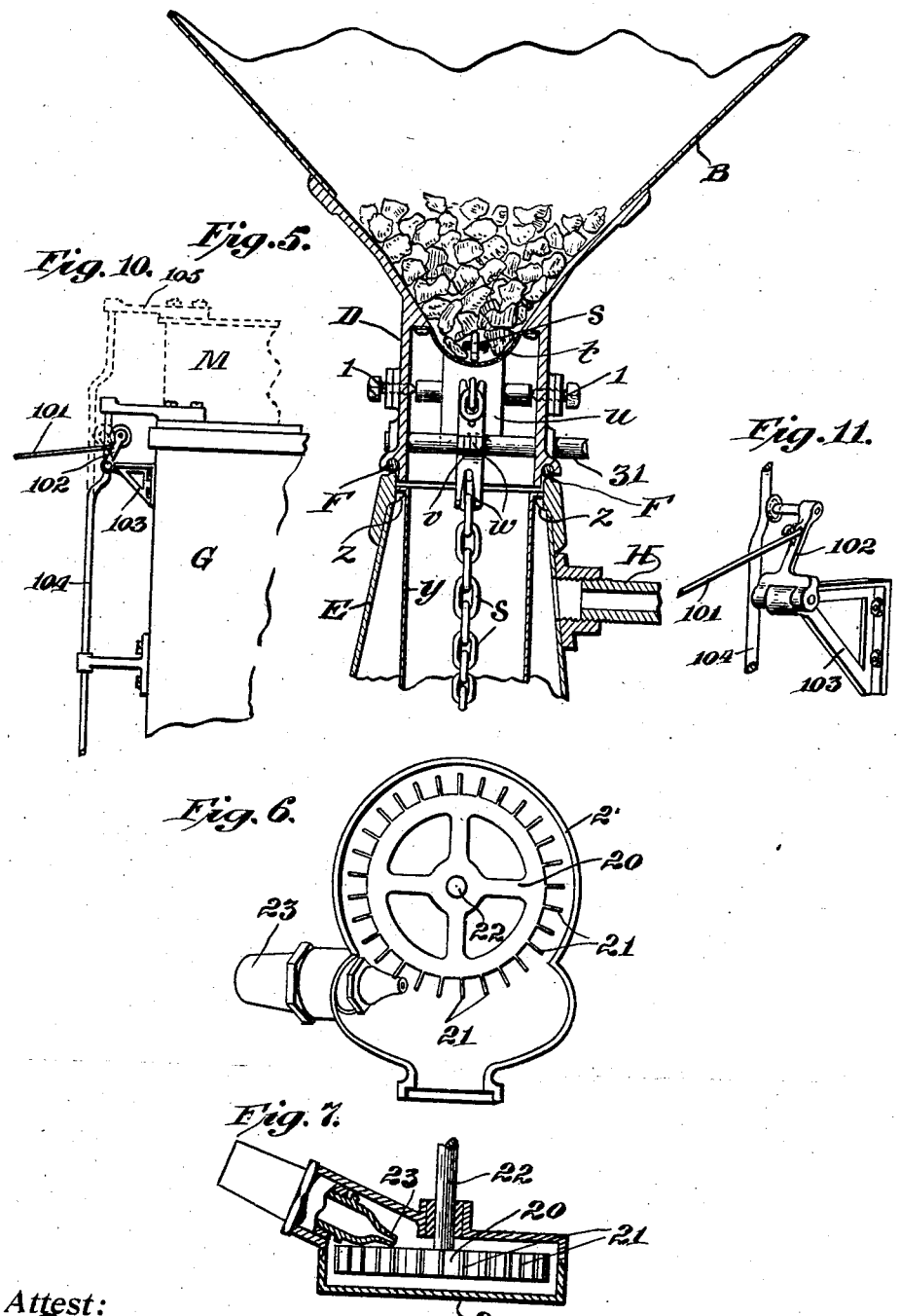

No. 884,328.　　　　　　　　　　　　　　　PATENTED APR. 7, 1908.
N. GOODYEAR.
ACETYLENE GENERATOR.
APPLICATION FILED MAY 4, 1905.
5 SHEETS—SHEET 5.
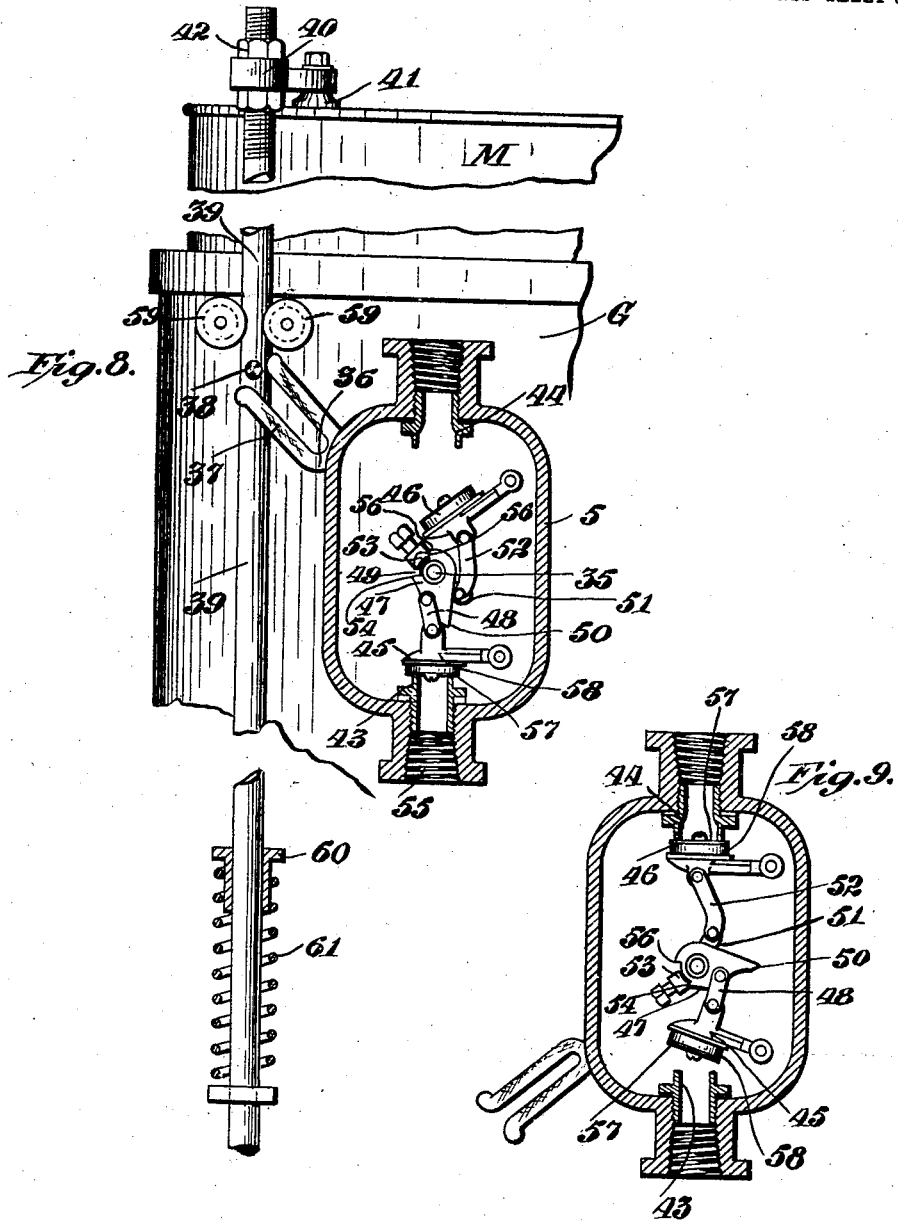
Attest:
Inventor:
NELSON GOODYEAR
by Dickerson, Brown, Raegener & Binney
Attys.

UNITED STATES PATENT OFFICE.

NELSON GOODYEAR, OF NEW YORK, N. Y., ASSIGNOR TO J. B. COLT COMPANY, OF NEW YORK, N. Y., A CORPORATION OF NEW JERSEY.

ACETYLENE-GENERATOR.

No. 884,328.  Specification of Letters Patent.  Patented April 7, 1908.

Application filed May 4, 1905. Serial No. 258,750.

*To all whom it may concern:*

Be it known that I, NELSON GOODYEAR, a citizen of the United States, and a resident of the borough of Manhattan, city, county, and State of New York, have invented certain new and useful Improvements in Acetylene-Generators, of which the following is a specification accompanied by drawings.

This invention relates to acetylene generators and its objects are to enable a hopper of any size to be used with a generator of a given size, to provide for the automatic disposal of the residuum, to enable carbid of any size to be fed, to automatically supply the water as needed, to prevent the generator and the gas from becoming overheated, and to prevent accidents due to the failure of water supply from any cause.

Other objects of the invention are to prevent the carbid in the hopper from clogging, to enable the carbid to be fed evenly, and to prevent carbid from being fed unless water is being fed.

Figure 1:
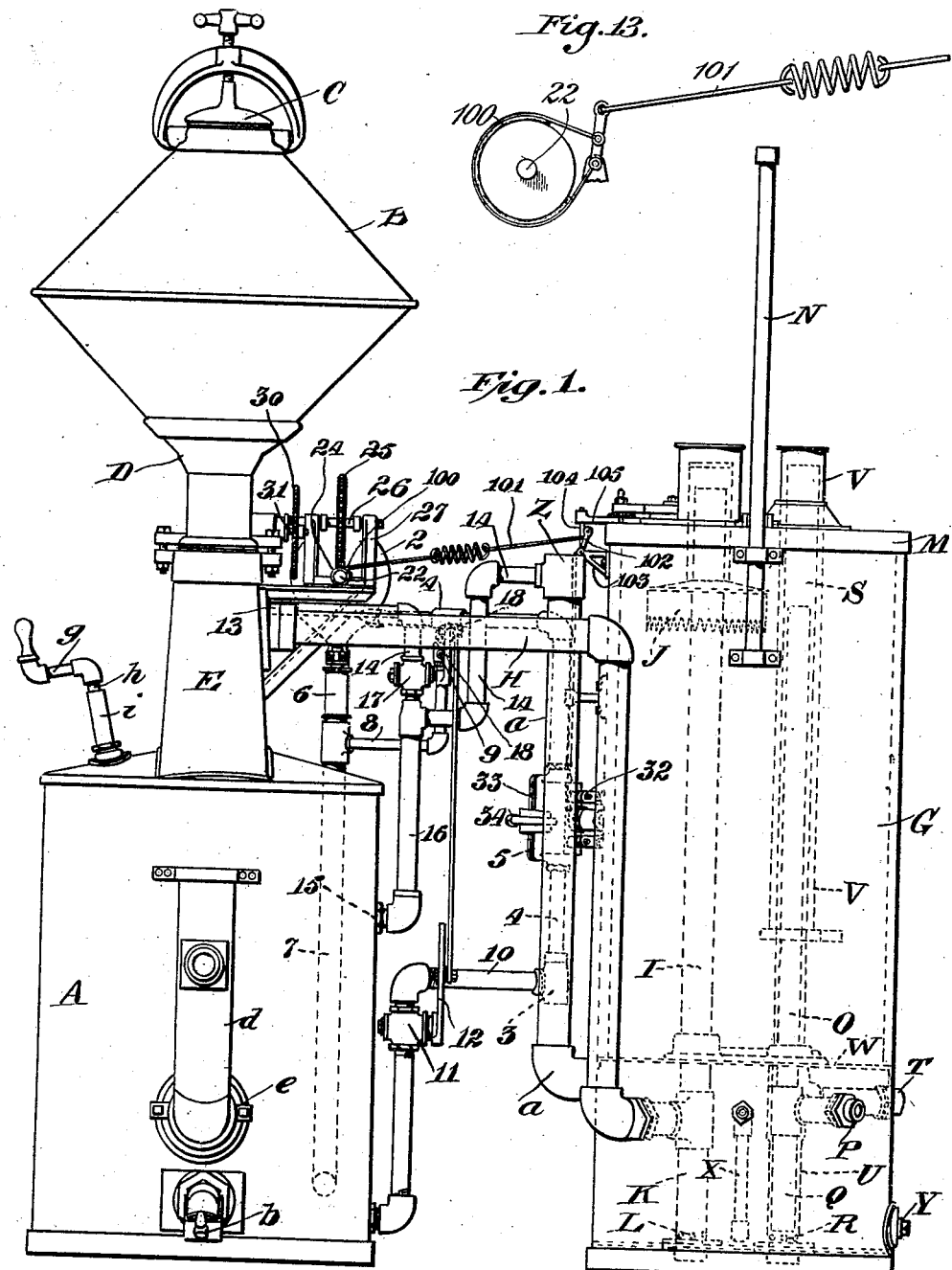
Figure 2:
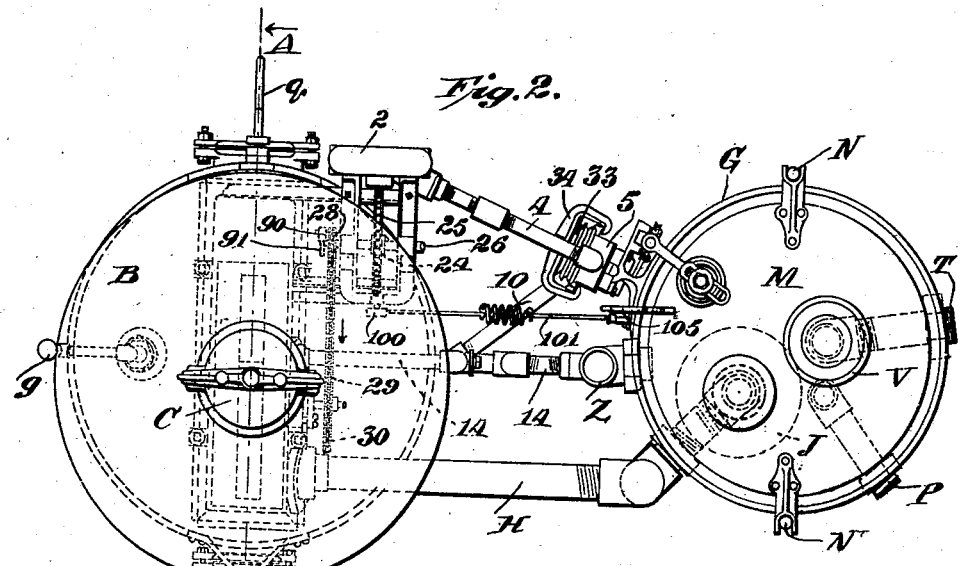
Figure 12:
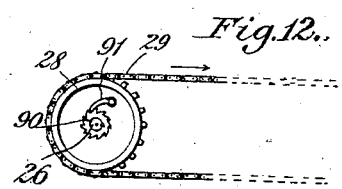
Figure 4:
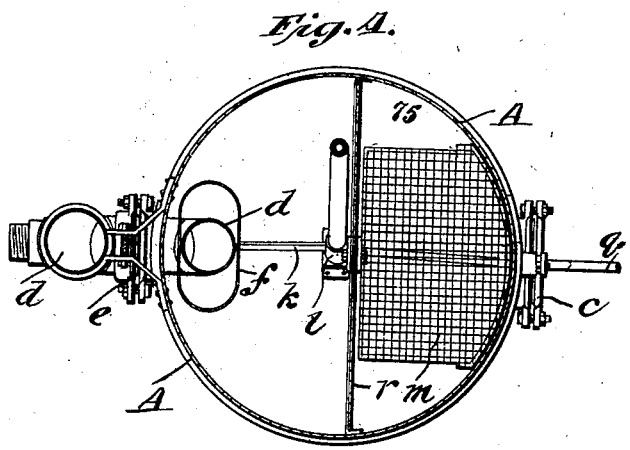

Further objects of the invention will hereinafter appear, and to these ends the invention consists of an acetylene generator for carrying out the above objects, embodying the features of construction, combinations of elements, and arrangement of parts, having the general mode of operation substantially as hereinafter fully described and claimed in this specification and shown in the accompanying drawings, in which Figure 1 is a front elevation of apparatus embodying the invention. Fig. 2 is a top plan view of the apparatus shown in Fig. 1. Fig. 3 is a vertical sectional elevation of the generator on the line A—B of Fig. 2. Fig. 4 is a horizontal sectional view on the line C—D of Fig. 3. Fig. 5 is an enlarged detail vertical sectional view on the line E—F of Fig. 3. Fig. 6 is a longitudinal sectional detail elevation taken through the motor casing. Fig. 7 is a horizontal sectional view taken through the motor casing and the nozzle. Fig. 8 is a detail side elevation of a portion of the gasometer and the controlling valve of the motor, with the casing removed, looking in the direction of the arrow Y of Fig. 2. Fig. 9 is a detail view of the valve with the casing removed, showing the valve in a different position from that illustrated in Fig. 8. Fig. 10 is a detail side view of the brake operating mechanism; Fig. 11 is a detail view of a portion of the brake mechanism. Fig. 12 is a detail view showing a portion of the driving connections for the feeding mechanism; Fig. 13 is a detail view of the brake for the motor.

Referring to the drawings, A represents the generator tank and B is the carbid hopper provided with a suitable cover C and supported by the feed-box D, which in turn is carried by the neck E, supported on the tank A. Preferably, between the feed-box and the neck there is a gasket joint F.

The gas generated is led to the actuating gasometer G through the gas-educting pipe H, which connects within the gasometer with the standpipe I, provided at the top with the floating trap J. The standpipe has a downwardly projecting extension K with apertures L, which provides a drain for the pipe. The actuating gasometer G is provided with a rising and falling gasometer bell M, which is suitably guided by the vertical guide-rods N. Within the gasometer is a gas-educting pipe O, provided with an outlet P and drain-pipe Q, having the apertures R. The gasometer is provided with an auxiliary gas-educting pipe or blow-off S, having the outlet T and the drain U. The pipe S is also provided with a telescopic tube V which extends upwardly above the top of the gasometer bell. The lower portion of the gasometer tank G is separated from the main portion by the partition W and is provided with an overflow-pipe X. Y is a drain-pipe for the gasometer tank. The lower chamber of the gasometer connects above the water-line with the escape Z by means of the pipe *a*.

The generator is provided with the flushout-cock *b*, hand-hole *c* for cleaning, and the overflow-pipe *d*, which is jointed at *e* on the outside of the tank. Over the inner end of the overflow-pipe *d* is a sleeve *f* which extends above the open end of the overflow-pipe and is designed to prevent the particles of carbid from prematurely entering the overflow.

A suitable stirrer is provided, extending substantially to the bottom of the generator tank. In this instance the stirrer is provided with a handle *g*, connected to a rod *h* extending through a sleeve *i*. The rod *h* is pivoted at the bottom of the generator at $j$ and is provided with wings $k$ which operate in a slot in the bearing-piece $l$.

The carbid as it is fed from the carbid hopper, falls upon a rocking grate $m$, pivoted at the side of the tank at the stuffing-box $n$ and also pivoted at $o$ to the partition $p$ extending across the center of the tank. The rocking-grate $m$ is provided with a suitable handle $q$, so that the grate may be rocked and the slag may be let into the bottom of the tank, to be removed through the flush-out or hand-hole when desired. As shown, the partition $p$ does not extend to the top of the water-line, nor does it extend to the bottom of the tank, the object being to provide a circulation around the partition, to stir up the residuum and increase the action of the water on the carbid. In order to prevent particles of carbid jumping over the partition and falling into the bottom of the tank, a screen $r$ is provided, preferably connected to the partition $p$ and extending above the top of the water, as shown.

The carbid-feeding means is designed to feed any size of carbid evenly and without clogging. As shown, the carbid is fed by means of an endless traveling jointed conveyer, which in this instance is embodied in an ordinary linked chain $s$ which travels in a trough $t$ which is preferably arranged beneath the bottom of the carbid hopper B and is removably secured to the hopper, so that said trough and chain may be removed when desired. Suitable means are provided for guiding and actuating the chain $s$, and in this instance the chain $s$ is guided by the grooved rolls $u$, as shown, and is actuated by the star-wheel $v$, having forked teeth $w$. A space $x$ is left between one of the rolls $u$ and the feed-box, to permit the carbid to drop into the generator tank and fall upon the grate $m$. Beneath the trough $t$ and chain, is preferably provided a protecting inclosing casing $y$, which preferably extends down into the water, as shown, and is open at the bottom. The object of this protective casing $y$ is to prevent the rush of moist gas having access to the chain and actuating devices therefor, so that the chain and its actuating and guiding parts will not become clogged with lime. The gas is educted from that portion of the chamber outside of the protective device $y$ and at a point remote from the feeding space $x$. The protective device $y$ may be suitably supported beneath the chain upon the lugs $z$ or in any other suitable manner, and the guiding rolls $u$ may be supported in any suitable manner, as by means of the pivot bearings 1. The feeding chain may be actuated in any suitable manner, and I have shown one suitable form of actuating mechanism which in this instance is controlled by the gas generated, this having been found to be a preferable mode of operation, although I am not to be understood as limiting the invention to the actuating mechanism disclosed. In the drawings the actuating mechanism for the chain is controlled by the rising and falling gas bell, but I am not to be understood as limiting the invention to this feature because the mechanism may be gas-controlled in other ways. According to the construction shown, the feeding chain is actuated hydraulically, and preferably the water for the actuating hydraulic motor is utilized as one source of supply for the generator tank. The water-supply pipe for the motor is in this instance provided with a valve, which is controlled by the gas generated.

In the drawings the hydraulic actuating motor for the feeding chain is represented at 2 and any suitable form of motor may be provided, but I prefer a high-speed impulse wheel which does not need to be of very great power and does not use more water than is necessary for the proper generation, and for this reason does not waste water. As shown, the impulse motor is provided with a suitable casing, and in this instance, by way of illustration, comprises an impulse wheel 20, having buckets or blades 21 on its periphery and carried by the shaft 22. A suitable nozzle 23 is connected to the pipe 4 and projects a stream of water upon the blades of the wheel in the usual manner. Any suitable connections may be provided for actuating the chain-feed from the motor, as shown in this instance, a motor shaft 22 being provided with a worm 24 which drives a worm-wheel 25, carried by the shaft 26, supported in the brackets 27. At the other end of the shaft 26 is a sprocket 28 connected by means of a suitable chain 29 to a sprocket 30 upon the shaft 31 of the star-wheel $v$, which actuates the chain.

At times it may be desired to rotate the star-wheel and chain by hand without actuating the motor, and in order to provide for this contingency, a suitable ratchet-and-pawl device is provided in the train of actuating connections from the motor to the star-wheel, as for instance, by arranging the ratchet-wheel 90 on the shaft 26 adjacent the sprocket 28 and permitting the sprocket 28 to run loose on the shaft, but connected thereto by means of a pawl 91 coöperating with the ratchet-wheel 90. By this means it will be seen that the sprocket 30 may be rotated by hand, in which case the pawl will slide loosely over the ratchet-wheel.

Water is supplied for actuating the wheel through the water-inlet 3, which may be connected to any suitable source as the street main or a tank, and connects by means of piping 4 with the wheel casing. In the pipe 4 is arranged the controlling valve for the wheel in the casing 5. The tail-water from the motor is led through the water-outletpipe 6 to the generator tank and in this instance the water is fed to the bottom of the tank through the pipe 7, although other arrangements for supplying the tail-water to the tank may be provided. One advantage of supplying the water to the bottom of the tank resides in the fact that fresh cool water is supplied beneath the grate m adjacent the point of generation, which aids in keeping the apparatus and gas cool. Preferably a by-pass 8 is connected from the water-outlet-pipe 6 to the main supply pipe 4 and controlled by a cock 9 so that additional water may be supplied to the generating chamber.

Suitable means are provided for venting the generating chamber when desired, both flushing-out and upon initially charging-in water. Means are provided for charging-in water through the supply pipe, as shown there being a branch-pipe 10 leading from the water-inlet to the base of the generating chamber and provided with a controlling-cock 11, having an operating handle 12. In the upper part of the neck E is a vent 13, connected by a pipe 14 with the escape Z. The air-inlet 15 is provided in the side of the generator tank, connected by pipe 16 with the pipe 14, which leads to the escape Z. A controlling vent-cock 17 is provided for the venting connection 14 and preferably the handle 18 of the vent-cock is operatively connected with the handle 12 of the water-inlet-cock, so that when water is being charged into the generator through the water-inlet-pipe 10, the vent-cock 17 is open to vent the generator to the atmosphere. When the generator is being flushed-out, air is permitted to enter through the air-inlet 15.

The motor-controlling valve in the water-pipe 4 is constructed to snap open and thus admit the water pressure to the motor immediately, thereby preventing loss of time and waste of water. The valve may be constructed in any suitable manner to accomplish this object, but I have shown a preferable form. The valve is also constructed to close automatically on the descent of the gasometer bell, thereby preventing the feeding of carbid when the bell is in substantially its lowermost position. If the carbid should become exhausted, the controlling valve will also automatically close.

The valve casing 5 is suitably supported in this instance from the gasometer tank by means of suitable brackets 32 and is provided with a removable cover 33, which is preferably secured to the casing by means of a clamp 34. Upon the valve spindle 35 is carried an arm 36, in this instance having a forked end 37 adapted to coöperate with a stop or projection 38 on a vertical rod 39, suitably supported from the gasometer bell, as by means of an arm 40, secured to the bell at 41. In this instance the upper end of the rod 39 is screw-threaded and the vertical position of the rod may be varied by means of the lock-nuts 42. Any other suitable coöperating connections may be provided between the gasometer bell and the valve, for controlling the valve by means of the gas pressure.

As shown, the valve casing 5 is provided with valve seats 43 and 44 with which the valves 45 and 46 coöperate. The valve shown in the drawings operates upon the principle of the toggle, and toggle-acting levers are provided, by means of which the valve 45 may be snapped open and positively closed. Upon the valve-spindle 35 is provided an arm 47 which forms one arm of the toggle-acting mechanism for the valve 45. To the arm 47 is connected a link 48 which forms the other arm of the toggle, the link 48 being connected to the valve 45. The arm 47 is provided with a recess or notch 49 and a downwardly extending nose 50, which nose prevents the knuckle of the toggle-acting mechanism for the valve 45 from passing more than a given distance beyond the center.

Connected to the spindle 35 to move therewith, is an arm 51 forming one arm of the toggle-acting mechanism for the valve 46. The other arm is formed by a link 52 pivoted to the arm 51 and to the valve 46. The arm 51 is provided with a lug 53 which operates in the slot 49 on the arm 47. As the forked arm 36 moves downward, the lug 53 is moved against the shoulder 54 on the arm 47 and breaks the toggle-acting mechanism of the valve 45, which valve is then snapped open under the pressure of the water entering the nozzle 55. As the forked arm 36 moves upward, the lug 53 bears against the shoulder 56 and positively closes the valve 45 to shut off the water pressure.

When the forked arm 36 is moved downward into the position shown in Fig. 9, the arm 51 forces the link 52 upward and closes the valve 46. Preferably, the valves 45 and 46 are made of brass or other suitable metal, and provided with brass caps 57, between which and the main portion of the valve are provided rubber washers 58 or other suitable resilient material. The operating rod 39 may be guided between rollers 59, provided upon the tank of the gasometer. If for any reason the forked arm 36 should be moved into a position to open the inlet-valve 45, and the parts should be so arranged that the stop 38 could not coöperate with the forked arm 36, means should be provided for automatically closing the valve 45 when the gasometer bell rises and in order to accomplish this end, another stop 60 is provided at the lower end of the rod 39, which stop will coöperate with the arm 36 to close the valve 45 when the bell rises. Preferably, the stop 60 is cushioned by means of a suitable spring 61.

According to this invention it will be seen that a hopper of any size may be used with a generator of a given size, because the amount of water which may be used is not dependent upon the size of the tank, owing to the constant supply to the tank derived from the motor. It will be seen that the residuum is disposed of automatically, because there is a constant overflow through the overflow-pipe *d*, and the provision of the usual means for the removal of the residuum is obviated. The flush-out *b* and hand-hole *c* are simply supplementary openings for cleaning out the heavy particles of slag which occasionally occur. The strong circulation within the generator tank takes place in the general direction of the arrows 70, 71, 72 and 73, indicated on Fig. 3, from which it will be seen that the material in the tank flows upwardly through the grate *m*, up over the top of the partition *p*, through the screen *r*, and down on the other side of the partition *p*, and up again between the over-flow pipe *d* and the sleeve *f*, over into the top of the overflow-pipe *d*. By dividing the generator tank by means of the partition *p*, this circulation is made possible, although other means may be devised for attaining the same objects. It may be said that the partition *p* directs the circulation in the desired direction,—that is to say, upwardly on that side of the tank at which the carbid is supplied, and downwardly on the side of the tank at which the overflow is provided, thereby stirring up the residuum at the bottom of the tank and keeping the carbid from falling off the grate *m* on the side toward the overflow, which would tend to generate a current in a reverse direction. The screen *r* at the top of the partition *p* keeps the particles of carbid from jumping over the top of the partition and aids in maintaining the circulation in the right direction. If desired, the grate *m* may extend from side to side of the tank. If desired, the partition *p* may be made of any desired shape and need not be perfectly straight,—that is to say, it may inclose the grate *m*.

One of the advantages of this invention resides in the fact that both carbid and water are automatically supplied as needed, and when desired the by-pass 8 may be opened to supplement the tail-water from the motor, and the by-pass, as will be seen, is controlled by the same valve that controls the supply of water to the motor, the advantage of this construction being that there is no waste of water through the by-pass when the valve is shut. The provision of the by-pass also enables the water supply to be relatively proportioned to the supply of carbid.

Another advantage of this generator resides in the fact that carbid is prevented from being fed unless water is being fed, so that there is no danger of overheating. Also, in case of failure of the water supply, the supply of carbid is shut off.

It will be seen that the chain *s* is not drawn tight across the guide-rollers *u*, but is of sufficient length to provide a slack loop, and the chain is driven from the under side in the direction of the arrow 80. The object of the provision of slack in the chain is to prevent binding if pieces of carbid should work their way between the chain and the bottom of the trough *t*, thus raising the upper side of the chain and tending to tighten it. By driving the chain from the under side in the direction indicated, it will be seen that there is always slack on the loose side.

It will be seen that the bottom of the inclosing partition *y* is open, and this provision is made so that if any pieces of carbid should be caught and carried around on the top of the under side of the chain, they may fall into the partition *y* and down through the open bottom of the tank into the water, instead of accumulating in the partition. This contingency almost never occurs, however, and therefore the circulation in the tank is not hindered in any way.

In order to arrest the motor promptly after the water pressure is shut off any suitable brake may be provided shown as a band brake 100 connected to the motor shaft. Preferably this brake is actuated by the gas generated by any suitable means, in this instance the band brake being connected by a suitable cord or wire 101 to a lever 102 pivoted upon the bracket 103 supported from the gasometer tank. A bent rod or arm 104 is shown supported from the bracket 105 on the top of the gasometer bell, the bend in said arm being adapted to coöperate with the roller on the lever 104 when the bell sinks far enough to shut off the water, and thus tighten the cord connected to the brake thereby arresting the motor.

It will be seen that the brake will act to stop the motor when the bell reaches a predetermined point in its travel irrespective of whether or not the water should be shut off, for it is conceivable that the valve might become broken.

Obviously some features of this invention may be used without others, and the invention may be embodied in widely varying forms; therefore, without limiting the invention to the constructions shown and described, nor enumerating equivalents,

I claim and desire to secure by Letters Patent the following:—

1. In a generator, the combination with the hopper, of a trough at the lower end of the hopper, an endless chain traveling therein for feeding the carbid, a feeding space at one end of the chain, and a protective casing open at the top underneath the chain and at the bottom, said casing extending down into the water and separating the feeding space from the chain and its operative devices, thereby preventing the gas from having access to the chain and its actuating devices and also permitting pieces of carbid carried inwardly past the edge of the casing by the chain to fall through the casing into the water.

2. In a generator, the combination with a hopper, of a feeding device, a generator tank beneath the feeding device, a feeding space through which the carbid is fed from the feeding device and a protective casing supported beneath said feeding device within the generator and open at the top and bottom, and separating the feeding device and its operative connections from the generator tank and from the feeding space, the top opening of the said casing being of sufficient size to substantially encircle the feeding device and its operative connections, thereby preventing gas from having access to said parts and permitting pieces of carbid carried inwardly past the edge of the casing by said parts to fall through the casing into the tank.

3. In a generator, the combination with the hopper and generator tank, of an endless traveling carbid-feeding conveyer, a high-speed impulse wheel suitably connected to actuate said conveyer, a toggle-acting gas-actuated valve adapted to snap open and closed for controlling the supply of water to said wheel, and means for supplying the tailwater from the impulse wheel to the generator tank.

4. In a generator, the combination with the hopper, of an endless traveling carbid-feeding conveyer, hydraulic means for actuating the conveyer, and a toggle-acting gas-actuated valve controlling said hydraulic actuating means, said valve being constructed to snap open quickly and supply the full amount of water immediately to said hydraulic means when needed.

5. In a generator, the combination with a hopper, of a feeding device, a generator tank beneath the feeding device, a feeding space through which the carbid is fed from the feeding device and a protective casing open at the top underneath the feeding device and at the bottom, said casing being within the generator tank separating the feeding device and its operative connections from the generator tank and from the feeding space, thereby preventing gas from having access to the feeding device and permitting pieces of carbid carried inwardly past the edge of the casing by said devices to fall through the casing into the tank.

6. In a generator, the combination with the gasometer and feeding mechanism, of a fluid pressure motor for actuating the feeding mechanism and a brake controlled by the gasometer for stopping said motor after the fluid pressure is shut off.

7. In a generator, the combination with the gasometer and feeding mechanism, of a fluid pressure motor for actuatnig the feeding mechanism, and frictional means controlled by the gasometer for stopping said motor after the fluid pressure is shut off.

8. In a generator, the combination with the gasometer and feeding mechanism, of a fluid pressure motor for actuating the feeding mechanism, and means controlled by the gasometer for shutting off the source of power and also for arresting the motor after the fluid pressure is shut off.

9. In a generator, the combination with the hopper and generator tank, of an endless traveling carbid-feeding conveyer, a high speed impulse wheel suitably connected to actuate said conveyer, a quick acting gas-actuated valve adapted to be opened substantially instantaneously to its full limit, and thereby supply the full head of water immediately to start said wheel.

10. In a generator, the combination with the hopper and generator tank, of an endless traveling carbid-feeding conveyer, a high speed impulse wheel suitably connected to actuate said conveyer, a quick acting gas-actuated valve adapted to be opened substantially instantaneously to its full limit, and thereby supply the full head of water immediately to start said wheel, and means for supplying the tail water from the impulse wheel to the generator tank.

11. In a generator, the combination with the hopper, of an endless traveling carbid-feeding conveyer, hydraulic means for actuating the conveyer, and a quick acting gas actuated valve adapted to be opened substantially instantaneously to its full limit, and thereby supply the full head of water immediately to start said hydraulic means for actuating the conveyer.

12. In a generator, the combination with the hopper, of a trough at the lower end of the hopper, an endless chain traveling therein for feeding the carbid, a feeding space at one end of the chain, and a protective casing open at the top underneath the chain and at the bottom, said casing extending down into the water and separating the feeding space from the chain and its operative devices, thereby preventing the gas from having access to the chain and its actuating devices and also permitting pieces of carbid carried inwardly past the edge of the casing by the chain to fall through the casing into the water, a generator tank, means within the tank for inducing a circulation of the water and residuum, and means for continuously removing the residuum.

13. In a generator, the combination with a hopper, of a feeding device, a generator tank beneath the feeding device, a feeding space through which the carbid is fed from the feeding device and a protective casing supported beneath said feeding device within the generator and open at the top and bottom, and separating the feeding device and its operative connections from the generator tank and from the feeding space, the top opening of the said casing being of sufficient size to substantially encircle the feeding device and its operative connections, thereby preventing gas from having access to said parts and permitting pieces of carbid carried inwardly past the edge of the casing by said parts to fall through the casing into the tank, and means within the generator tank for inducing the circulation of the water and residuum, and means for continuously removing the residuum.

14. In a generator, the combination with a hopper, of a feeding device, a generator tank beneath the feeding device, a feeding space through which the carbid is fed from the feeding device and a protective casing open at the top underneath the feeding device and at the bottom, said casing being within the generator tank separating the feeding device and its operative connections from the generator tank and from the feeding space, thereby preventing gas from having access to the feeding device and permitting pieces of carbid carried inwardly past the edge of the casing by said devices to fall through the casing into the tank, means within the generator tank for inducing a circulation of the water and residuim, and means for continuously removing the residuum.

15. In a generator, the combination with the gasometer and feeding mechanism, of a fluid pressure motor for actuating the feeding mechanism and a brake controlled by the gasometer bell for stopping the said motor when the bell reaches a predetermined point in its travel.

16. In a generator, the combination with the hopper and generator tank, of feeding mechanism, an impulse wheel suitably connected to actuate said mechanism, and a quick acting gas actuated valve adapted to be opened substantially instantaneously to its full limit, and thereby supply the full head of water immediately to start the wheel.

17. In a generator, the combination with the hopper and generator tank, of feeding mechanism, an impulse wheel suitably connected to actuate said mechanism, a quick acting gas actuated valve adapted to be opened substantially instantaneously to its full limit, and thereby supply the full head of water immediately to start said wheel, and means for supplying the tail water from the impulse wheel to the generator tank.

In testimony whereof I have signed this specification in the presence of two subscribing witnesses.

NELSON GOODYEAR.

Witnesses:
A. L. O'BRIEN,
CHARLES PILLANE.